United States Patent
Cai et al.

(10) Patent No.: US 8,942,668 B2
(45) Date of Patent: Jan. 27, 2015

(54) CAMEL SERVICE CHARGING IN IMS NETWORKS

(75) Inventors: Yigang Cai, Naperville, IL (US); David C. Harms, West Chicago, IL (US); Bharat H. Patel, Naperville, IL (US); Angelica T. Remoquillo, Naperville, IL (US)

(73) Assignee: Alcatel Lucent, Boulogne Billancourt (FR)

( * ) Notice: Subject to any disclaimer, the term of this patent is extended or adjusted under 35 U.S.C. 154(b) by 1712 days.

(21) Appl. No.: 11/738,387

(22) Filed: Apr. 20, 2007

(65) Prior Publication Data

US 2008/0261559 A1   Oct. 23, 2008

(51) Int. Cl.
*H04M 11/00* (2006.01)
*H04L 12/14* (2006.01)
*H04L 29/06* (2006.01)

(52) U.S. Cl.
CPC ............ *H04L 12/14* (2013.01); *H04L 12/1403* (2013.01); *H04L 65/1016* (2013.01)
USPC .......................................... 455/406; 455/405

(58) Field of Classification Search
CPC . H04L 12/14; H04L 12/1403; H04L 65/1016; H04L 12/1467; H04L 12/1414; H04W 4/24; H04M 15/66; H04M 15/64; H04M 15/80; H04M 15/43; H04M 15/65; H04M 15/41; H04M 2215/0164; H04M 2215/44
USPC .................................................. 455/405, 406
See application file for complete search history.

(56) References Cited

U.S. PATENT DOCUMENTS

| | | | |
|---|---|---|---|
| 2002/0068545 A1* | 6/2002 | Oyama et al. ................. | 455/406 |
| 2003/0096592 A1* | 5/2003 | Moreau et al. ................ | 455/406 |
| 2004/0132427 A1* | 7/2004 | Lee et al. ....................... | 455/406 |
| 2005/0089020 A1* | 4/2005 | Ahlback et al. ............... | 370/352 |
| 2006/0111077 A1* | 5/2006 | Hurtta ........................... | 455/406 |
| 2006/0168303 A1* | 7/2006 | Oyama et al. ................. | 709/231 |
| 2007/0018786 A1* | 1/2007 | Shan .............................. | 340/5.4 |
| 2007/0041536 A1* | 2/2007 | Koskinen et al. ........ | 379/114.28 |
| 2007/0115861 A1* | 5/2007 | Zhang et al. .................. | 370/259 |
| 2007/0185809 A1* | 8/2007 | Duan ............................. | 705/39 |

(Continued)

OTHER PUBLICATIONS

"Universal Mobile Telecommunications System (UMTS); Telecommunication management; Charging management; Diameter charging applications (3GPP TS 32.299 version 6.3.0 Release 6); ETSI TS 132 299" Jun. 2005, v6.3.0 p. 1-67.*

(Continued)

*Primary Examiner* — Liton Miah
(74) *Attorney, Agent, or Firm* — Duft Bornsen & Fettig, LLP

(57) ABSTRACT

IMS networks and associated methods are disclosed that provide charging for CAMEL services provided in the IMS network. If a CAMEL service is provided by an application server for a session in an IMS network, then the application server generates CAMEL charging data for the service provided and also generates a charging message, such as a Diameter ACR message. The application server includes the CAMEL charging data in the charging message and transmits the charging message to a charging collector system. The charging collector system generates a CDR for the session, and maps the CAMEL charging data from the charging message to the CDR. The charging collector system then transmits the CDR to a billing system. The billing system may then charge for the CAMEL service provided in the IMS network.

15 Claims, 14 Drawing Sheets

(56) References Cited

U.S. PATENT DOCUMENTS

| | | | |
|---|---|---|---|
| 2007/0189297 A1* | 8/2007 | Duan | 370/394 |
| 2008/0114690 A1* | 5/2008 | Skidmore et al. | 705/52 |
| 2008/0153457 A1* | 6/2008 | Stura et al. | 455/406 |
| 2008/0256251 A1* | 10/2008 | Huotari et al. | 709/229 |

OTHER PUBLICATIONS

"Digital cellular telecommunications systems (Phase 2+); Universal mobile telecommunications system (UMTS); IP multimedia (IM) Session handling; IM call model; Stage 2 (3GPP TS 23.218 version 7.4.0 Release 7); ETSI TS 123 218" Dec. 12, 2006, vol. 3-CN1, No. V7.4.0, pp. 1-60, ETSI Standards, LIS, Sophia Antipolis CEDEX, France.

"Universal mobile telecommunications system (UMTS); Telecommunication management; Charging management; Charging Data Record (CDR) parameter description (3GPP TS 32.298 version 6.4.1 Release 6) ETSI TS 132 298", Jun. 1, 2006, vol. 3-SA5, No. V6.4.1, pp. 1-123, ETSI Standards, LIS, Sophia Antipolis CEDEX, France.

"Digital cellular telecommunications systems (Phase 2+); Universal mobile telecommunications system (UMTS); Customised Applications for Mobile network Enhanced Logic (CAMEL) Phase 4; Stage 2; IM CN Interworking (3GPP TS 23.278 version 7.1.0 Release 7) ETSI TS 123 278", Mar. 1, 2006, vol. 3-CN2, No. V7.1.0, pp. 1-154, ETSI Standards, LIS, Sophia Antipolis CEDEX, France.

* cited by examiner

FIG. 4

| CAMEL |
|---|
| Description : This CAMEL AVP holds CAMEL data and is organized as one set of General CAMEL Data AVPs plus up to 5 sets of Per Service CAMEL Data AVPs.<br>   [General-CAMEL-Data] -    AVP Code = 26<br>   * [Per-Service-CAMEL-Data] -AVP Code = 40 |
| AVP Code : 25 |
| Type: Grouped |

FIG. 5

| General CAMEL Data |
|---|
| Description : This AVP holds the General CAMEL Data AVPs.<br>It contains the following AVPs.<br>   [Served-IMSI] -                          AVP Code = 27<br>   [Served-MSISDN] -                   AVP Code = 28<br>   [Recording-Entity] -                    AVP Code = 29<br>   [Interrogation-Time-Stamp] -      AVP Code = 30<br>   [Called-Address] -                     AVP Code = 31<br>   [Calling-Address] -                     AVP Code = 32<br>   [Call-Reference] -                      AVP Code = 33<br>   [MSC-server-indication] -           AVP Code = 34<br>   [Network-call-reference] -          AVP Code = 35<br>   [MSC-Address] -                       AVP Code = 36<br>   [CAMEL-initiated-CF-indicator] -  AVP Code = 37<br>   [Number-of-DP-encountered] -    AVP Code = 38<br>   [Level-of-CAMEL-service] -         AVP Code = 39 |
| AVP Code : 26 |
| Type: Grouped |

FIG. 6

| Served IMSI |
|---|
| Description : This AVP contains the IMSI of the served party. The term "served" party is used to describe the mobile subscriber involved in the transaction recorded (e.g., the calling subscriber in the case of an MOC record). |
| AVP Code : 27 |
| Type: OctetString |

FIG. 7

| Served MSISDN |
|---|
| Description : This AVP contains the MSISDN of the served party. The term "served" party is used to describe the mobile subscriber involved in the transaction recorded (e.g., the called subscriber in case of an MTC record). |
| AVP Code : 28 |
| Type:  OctetString |

FIG. 8

| Recording Entity |
|---|
| Description : This AVP contains the E.164 number of the GMSC. |
| AVP Code : 29 |
| Type:  OctetString |

FIG. 9

| Interrogation Time Stamp |
|---|
| Description : This AVP contains the time in UTC format at which the interrogation was invoked. |
| AVP Code : 30 |
| Type:  OctetString |

FIG. 10

| Called Address |
|---|
| Description : This AVP contains the E.164 number of the called party as received by the GMSC/gsmSSF. |
| AVP Code : 31 |
| Type:  OctetString |

FIG. 11

| Calling Address |
|---|
| Description : This AVP contains the E.164 number of the calling party, if available. |
| AVP Code : 31 |
| Type:  OctetString |

FIG. 12

| Call Reference |
|---|
| Description : This AVP contains a local identifier distinguishing between transactions on the same MS. |
| AVP Code : 33 |
| Type: OctetString |

FIG. 13

| MSC Server Indication |
|---|
| Description : This AVP contains an indication if the CAMEL call handling is active in the MSC server. Enumerated AVP can take the following values:<br><br>False (0)<br>True (1) |
| AVP Code : 34 |
| Type: Enumerated |

FIG. 14

| Network call reference |
|---|
| Description : This AVP contains an identifier to correlate transactions on the same call taking place in different network nodes. |
| AVP Code : 35 |
| Type: OctetString |

FIG. 15

| MSC Address |
|---|
| Description : This AVP contains the E.164 number assigned to the MSC that generated the network call reference. |
| AVP Code : 36 |
| Type: OctetString |

FIG. 16

| CAMEL initiated CF indicator |
|---|
| Description : This AVP indicates that the CAMEL server initiated call forwarding. This Enumerated AVP can take the following values:<br><br>noCAMELCallForwarding (0)<br>cAMELCallForwarding (1) |
| AVP Code : 37 |
| Type: Enumerated |

FIG. 17

| Number of DP encountered |
|---|
| Description : This AVP contains a number that counts how often armed detection points (TDP and EDP) were encountered. |
| AVP Code : 38 |
| Type: Unsigned32 |

FIG. 18

| Level of CAMEL service |
|---|
| Description : This AVP is an indicator of the complexity of the CAMEL feature used. It can take the following values:<br><br>basic (0),<br>callDurationSupervision (1)<br>onlineCharging (2) |
| AVP Code : 39 |
| Type: Enumerated |

FIG. 19

| Per Service CAMEL Data |
|---|
| Description : This Per Service CAMEL Data AVP is of type Grouped. The overall CAMEL Data AVP can contain as many as 5 of these Per Service CAMEL AVPs. This AVP contains one of each of the following AVPs except it can hold up to 5 CAMEL Call Leg Information AVPs.<br><br>    [GsmSCF-address] -          AVP Code = 41<br>    [Service-key] -                 AVP Code = 42<br>    [Default-call-handling] -      AVP Code = 43<br>    [Free-format-Data] -         AVP Code = 44<br>    [Incoming-TKGP] -          AVP Code = 45<br>    *[CAMEL-Call-Leg-Information] -  AVP Code = 46 |
| AVP Code : 40 |
| Type: Grouped |

FIG. 20

| GSM SCF address |
|---|
| Description : This AVP identifies the CAMEL server serving the subscriber. |
| AVP Code : 41 |
| Type: OctetString |

FIG. 21

| Service key |
|---|
| Description : This AVP contains the CAMEL service logic to be applied. |
| AVP Code : 42 |
| Type: Unsigned32 |

FIG. 22

| Default call handling |
|---|
| Description : This AVP indicates whether or not a CAMEL call encountered default call handling. This field shall be present only if default call handling has been applied. This AVP can take the following values:<br><br>continueCall (0)<br>releaseCall (1) |
| AVP Code : 43 |
| Type: Enumerated |

FIG. 23

| Free format Data |
|---|
| Description : This AVP contains data sent by the GSM SCF in the Furnish Charging Information (FCI) messages. The data can be sent either in one FCI message or several FCI messages with append indicator. |
| AVP Code : 44 |
| Type: OctetString |

FIG. 24

| Incoming TKGP |
|---|
| Description : This AVP contains the GMSC trunk group on which the call originated. If available in 3G, this parameter shall be supplied. The first four chars shall be set to the Trunk Group Number and the next four chars shall be set to the Trunk Group Member Number. |
| AVP Code : 45 |
| Type: OctetString |

FIG. 25

| CAMEL call leg information |  |
| --- | --- |
| Description : This AVP is of type Grouped. This AVP can hold one of each of the following AVPs. | |
| [CAMEL-Destination-Address] - | AVP Code = 47 |
| [Connected-Address] - | AVP Code = 48 |
| [Roaming-Address] - | AVP Code = 49 |
| [Msc-Outgoing-TKGP] - | AVP Code = 50 |
| [Seizure-Time] - | AVP Code = 51 |
| [Answer-Time] - | AVP Code = 52 |
| [Release-Time] - | AVP Code = 53 |
| [Call-Duration] - | AVP Code = 54 |
| [CAMEL-Initiated-CF-Indicator] - | AVP Code = 37 |
| [Cause-For-Termination] - | AVP Code = 56 |
| [Free-format-Data] - | AVP Code = 44 |
| [Diagnostics] - | AVP Code = 58 |
| [CAMEL-Modification-Parameters] - | AVP Code = 59 |
| AVP Code : 46 | |
| Type: Grouped | |

FIG. 26

| CAMEL Destination Address |
| --- |
| Description : This AVP contains the E.164 number available for routing after the CAMEL server inquiry. |
| AVP Code : 47 |
| Type: OctetString |

FIG. 27

| Connected Address |
| --- |
| Description : This AVP contains the E.164 number of connected party if different from 'CAMEL Destination Address'. |
| AVP Code : 48 |
| Type: OctetString |

FIG. 28

| Roaming Address |
|---|
| Description : This AVP contains the Mobile Station Roaming number (E.164) used to route this leg. |
| AVP Code : 49 |
| Type: OctetString |

FIG. 29

| MSC Outgoing TKGP |
|---|
| Description : This AVP contains the trunk group on which the call left the MSC. The first four chars shall be set to the Trunk Group Number and the next four chars shall be set to the Trunk Group Member Number. |
| AVP Code : 50 |
| Type: OctetString |

FIG. 30

| Seizure Time |
|---|
| Description : This AVP contains the time in UTC format of traffic channel seizure for this leg. |
| AVP Code : 51 |
| Type: OctetString |

FIG. 31

| Answer Time |
|---|
| Description : This AVP contains the time in UTC format when the answer message is received for this leg. |
| AVP Code : 52 |
| Type: OctetString |

FIG. 32

| Release Time |
|---|
| Description : This AVP contains the time in UTC format when the leg is released or moved into another call segment. |
| AVP Code : 53 |
| Type: OctetString |

FIG. 33

| Call Duration |
|---|
| Description : This AVP contains the time in seconds between answer and release timestamp of this leg. |
| AVP Code : 54 |
| Type: Unsigned32 |

FIG. 34

| Cause For Termination |
|---|
| Description : This AVP contains the reason for the release of the connection. |
| AVP Code : 56 |
| Type: Unsigned32 |

FIG. 35

| Diagnostics |
|---|
| Description : This AVP contains a more detailed reason for disappearing of the leg in this call segment. |
| AVP Code : 58 |
| Type: Unsigned32 |

FIG. 36

| CAMEL Modification Parameters |
|---|
| Description : The CAMEL Modification Parameters is of type Grouped and contains one of each of the following AVPs except it can hold up to 2 Generic Addresses AVPs.<br><br>    [Calling-Party-Address] -     AVP Code = 60<br>    [Calling-Party-Category] -     AVP Code = 61<br>    [Original-Called-Party-Address] -     AVP Code = 62<br>    * [Generic-Addresses] -     AVP Code = 63<br>    [Redirecting-Party-Address] -     AVP Code = 64<br>    [Redirection-Counter] -     AVP Code = 65 |
| AVP Code : 59 |
| Type: Grouped |

FIG. 37

| Calling Party Address |
|---|
| Description : This AVP contains Calling Party E.164 number modified by CAMEL service. |
| AVP Code : 60 |
| Type: OctetString |

FIG. 38

| Calling Party Category |
|---|
| Description : This AVP contains the Calling Party Category of modified by the CAMEL Service. |
| AVP Code : 61 |
| Type: OctetString |

FIG. 39

| Original Called Party Address |
|---|
| Description : This AVP contains the E.164 number dialed by the calling subscriber. |
| AVP Code : 62 |
| Type: OctetString |

FIG. 40

| Generic Addresses |
|---|
| Description : This AVP contains the E.164 Generic Numbers for the CAMEL service. |
| AVP Code : 63 |
| Type: OctetString |

FIG. 41

| Redirecting Party Address |
|---|
| Description : This AVP contains the Redirecting Party E.164 number for the CAMEL service. |
| AVP Code : 64 |
| Type: OctetString |

FIG. 42

| Redirection Counter |
|---|
| Description : This AVP contains the number of redirections. |
| AVP Code : 65 |
| Type: Unsigned32 |

CAMEL SERVICE CHARGING IN IMS NETWORKS

BACKGROUND OF THE INVENTION

1. Field of the Invention

The invention is related to the field of communications and, in particular, to charging for CAMEL services in an IMS network.

2. Statement of the Problem

First-generation (1G) wireless telephone technology provides standards for mobile communications using analog signals between a mobile device and a base station. Second-generation (2G) wireless telephone technology is a successor to the 1G standards. 2G technology provides standards for mobile communications using digital signals instead of analog signals between the mobile device and the base station. Some common 2G technologies are Global System for Mobile Communications (GSM), IS-95 (which is based on Code Division Multiple Access (CDMA), etc. 2G networks, such as a GSM network, typically provide intelligent network (IN) capabilities. Intelligent networks distribute the functionality of providing telephony services (e.g., call waiting, call forwarding, etc) among multiple intelligent networks. For instance, when a Mobile Switching Center (MSC) in a GSM network receives signaling for a call, the MSC processes service triggers to determine whether a service should be invoked. If a service trigger is detected, then the MSC interrupts call processing and routes the call to the proper intelligent network where the intelligent network provides the service for the call.

Customized Application of Mobile Enhanced Logic (CAMEL) is logic typically used in GSM networks to add new services to the network. CAMEL is defined in the 2G standards and is based on the concept of intelligent networks. CAMEL triggers are defined and accessible by the MSC of the network. When the MSC receives a call, the MSC processes the CAMEL triggers along with other triggers to determine whether a CAMEL service should be invoked. If a CAMEL trigger is detected, then the MSC interrupts call processing and transmits a CAMEL application protocol (CAP) message to the proper intelligent network (typically referred to as a GSM service control function (SCF)). Responsive to the CAP message, the GSM SCF provides the appropriate CAMEL service for the call. Exemplary CAMEL services include Calling Line Identification Presentation (CLIP), Calling Line Identification Restriction (CLIR), call forwarding, call holding, etc.

After the GSM SCF provides the CAMEL service for the call, the GSM SCF generates CAMEL charging data for the service, and transmits a CAP response to the MSC that includes the CAMEL charging data. After the call has ended, the MSC generates a Call Detail Record (CDR) and populates the fields of the CDR with charging data for the call. The 2G standards for the CDR define fields for the CAMEL charging data along with fields for other charging data for the call. The MSC then transmits the CDR to a billing system, and the billing system resolves the billing for the call.

A successor to the 2G wireless telephone technology is third-generation (3G) wireless telephone technology. The services associated with 3G provide the ability to simultaneously transfer both voice data (e.g., a telephone call) and non-voice data (e.g., downloading information, exchanging email, and instant messaging). One type of 3G communication network gaining popularity is an IP Multimedia Subsystem (IMS) network. As set forth in the $3^{rd}$ Generation Partnership Project (3GPP) or 3GPP2, IMS provides a common core network having access-agnostic network architecture for converged networks. Service providers are accepting this architecture in next generation network evolution. The IMS architecture is initially defined by the 3GPP to provide multimedia services to mobile subscribers over an Internet Protocol (IP) network. IP networks have become the most cost savings bearer network to transmit video, voice, and data. IMS uses the advantage of IP networks to provide multimedia services for IMS subscribers on an IMS platform. The signaling used within IMS networks is Session Initiation Protocol (SIP). IMS defines the standard SIP interface between application servers, the IMS core network (CSCF), the IMS subscriber, the IMS database (HSS), and IMS billing elements. These standards can reduce the network integration costs and let the subscriber enjoy more stable services.

Network operators may want to implement CAMEL in IMS networks to provide CAMEL services. One problem with present IMS networks is that the IMS standards have not defined how charging is performed for CAMEL services that are provided by an IMS network. As a result, CAMEL services cannot be provided in IMS networks as there is no way to charge for the CAMEL services.

SUMMARY OF THE SOLUTION

Embodiments of the invention solve the above and other problems by providing charging for CAMEL services provided by an IMS network. When a CAMEL service is provided for a session (or call) in an IMS network as provided herein, the IMS network generates CAMEL charging data for the service, and includes the CAMEL charging data in the appropriate charging message. The IMS network also maps the CAMEL charging data from the charging message into a charging data record for the session, and provides the charging data record to a billing system. The billing system may then bill for the CAMEL service provided by the IMS network much like it can charge for CAMEL services provided by a 2G network (e.g., a GSM network). As a result, IMS networks may advantageously provide CAMEL services and charge for the services as desired.

In one embodiment, an IMS network is adapted to provide charging for CAMEL services provided in the IMS network. The IMS network includes a session control function (e.g., an IMS S-CSCF), an application server, and a charging collector system (e.g., a CCF). When in operation, the session control function receives a signaling message (e.g., a SIP INVITE message) for a session, and processes CAMEL triggers and the signaling message to determine whether a trigger condition is detected. If a trigger condition is detected, then the session control function transmits a signaling message to the application server.

Responsive to receiving the signaling message, the application server provides a CAMEL service for the session. The application server then generates CAMEL charging data for the CAMEL service and generates a charging message for the session that includes the CAMEL charging data. One example of a charging message is a Diameter Rf charging message, such as a Diameter Accounting Request (ACR) message. The application server then transmits the charging message to the charging collector system.

Responsive to receiving the charging message, the charging collector system generates a charging data record for the session, and maps the CAMEL charging data from the charging message to the charging data record. The charging collector system then transmits the charging data record toga billing system.

The billing system may then process the CAMEL charging data in the charging data record to perform offline charging for the session. The billing system can advantageously charge for the CAMEL service provided in the IMS network much like charging can be performed in 2G networks, such as a GSM network. As a result, CAMEL services can be effectively implemented in the IMS network.

The invention may include other exemplary embodiments described below.

DESCRIPTION OF THE DRAWING

The same reference number represents the same element or the same type of element on all drawings.

FIGS. 4-42 illustrate exemplary AVPs defined for CAMEL charging data in exemplary embodiments of the invention.

DETAILED DESCRIPTION OF THE INVENTION

FIGS. 1-42 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
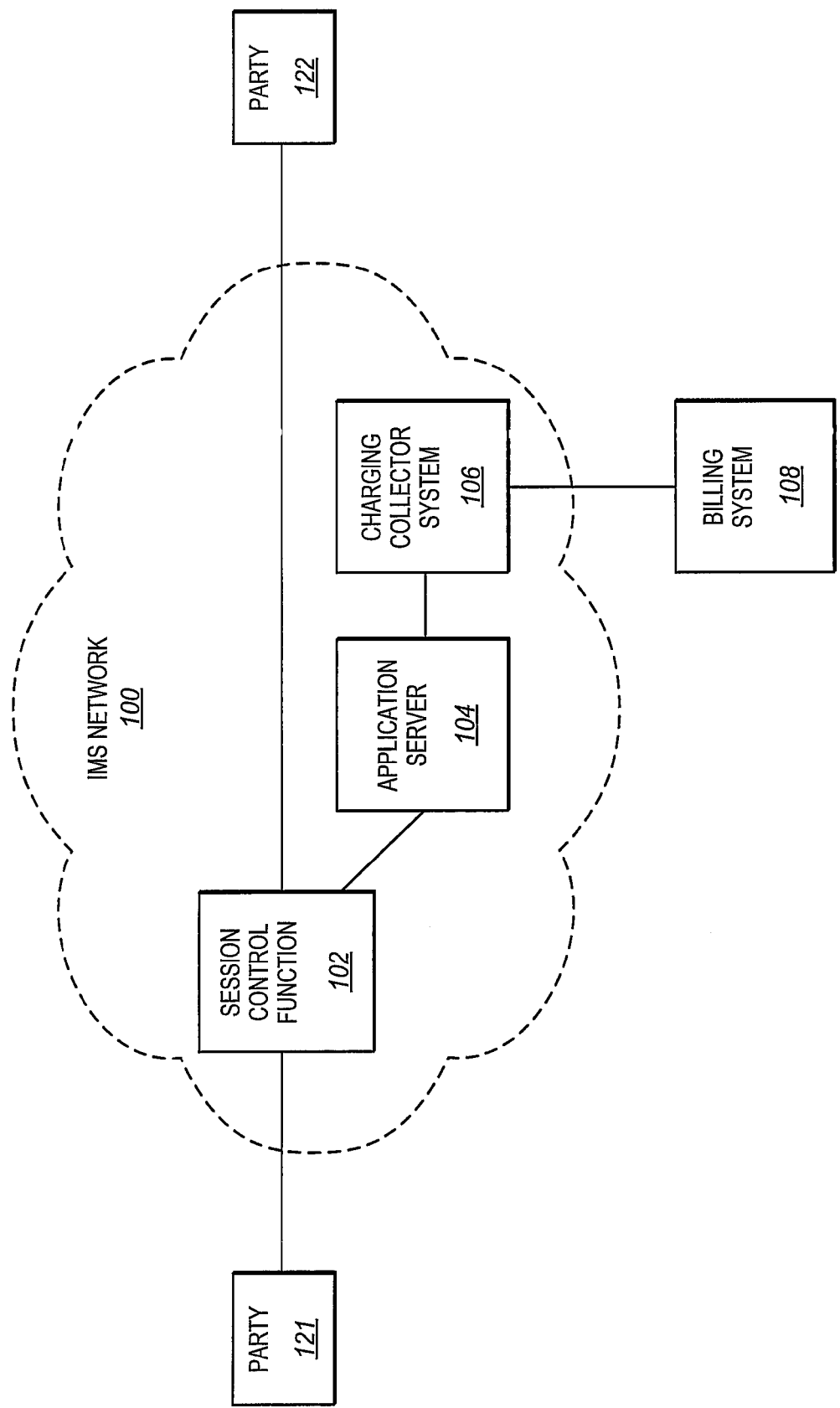
FIG. 1 illustrates an IMS network in an exemplary embodiment of the invention.

FIG. 1 illustrates an IMS network 100 in an exemplary embodiment of the invention. IMS network 100 includes a session control function 102, an application server 104, and a charging collector system 106. Session control function 102 comprises any server(s), system, or application(s) that processes signaling messages (e.g., SIP messages) for session control, such as a Session-Call Session Control Function (S-CSCF). Application server 104 comprises any server(s), system, or application(s) that provide a service for a session (or call) in some manner. The term "application server" applies also to an IP Multimedia Service Switching Function (IM-SSF) or another IMS node that provides services for a session. Charging collector system 106 comprises any server(s), system, or application(s) that receives charging messages for a session and generates charging data records for the session. For example, in an IMS network implementing offline charging, charging collector system 106 may comprise a Charging Collector Function (CCF) as suggested by the 3GPP in Release 5 that is available at www.3gpp.org., or a Charging Data Function and Charging Gateway Function (CDF/CGF) as suggested by the 3GPP in Release 6.

FIG. 1 also illustrates a billing system 108. Billing system 108 may be part of IMS network 100 or may be part of another network or entity that provides billing for IMS network 100. In addition to IMS network 100, billing system 108 may provide billing for other 3G networks or 2G networks (not shown in FIG. 1).

IMS network 100 as provided herein is adapted to provide CAMEL services for sessions initiated over IMS network 100. The term "CAMEL service" refers to services or features provided by CAMEL as defined by 2G standards, or other standards derived from the 2G standards or resembling the 2G standards, such as CAMEL 4 implemented in a 3G UMTS network. CAMEL services as described herein also apply to other service logic adapted to provide CAMEL-type services. To provide the CAMEL services, CAMEL triggers are defined for IMS users. The CAMEL triggers may be defined as CAMEL subscription information (CSI) that is stored in a service profile of an IMS user. The CAMEL triggers may also be referred to as a trigger detection profile (TDP) that defines conditions that cause CAMEL to be invoked. Also, application server 104 is programmed with CAMEL in order to provide the CAMEL service.

Assume for this embodiment that a session is initiated or established in IMS network 100 between a first party 121 and a second party 122. The session may be an IMS session, a wireless call, a text or multimedia message, etc. Party 121 and party 122 are operating devices adapted to communicate with IMS network 100, such as SIP-enabled devices. These devices may be mobile devices, wireline devices, etc. Session control function 102 is adapted to serve the session initiated between party 121 and party 122. In serving the session, session control function 102 facilitates the exchange of signaling messages (e.g., SIP messages) between party 121 and party 122 (and other network nodes) to setup, maintain, and tear down the session.

Figure 2:
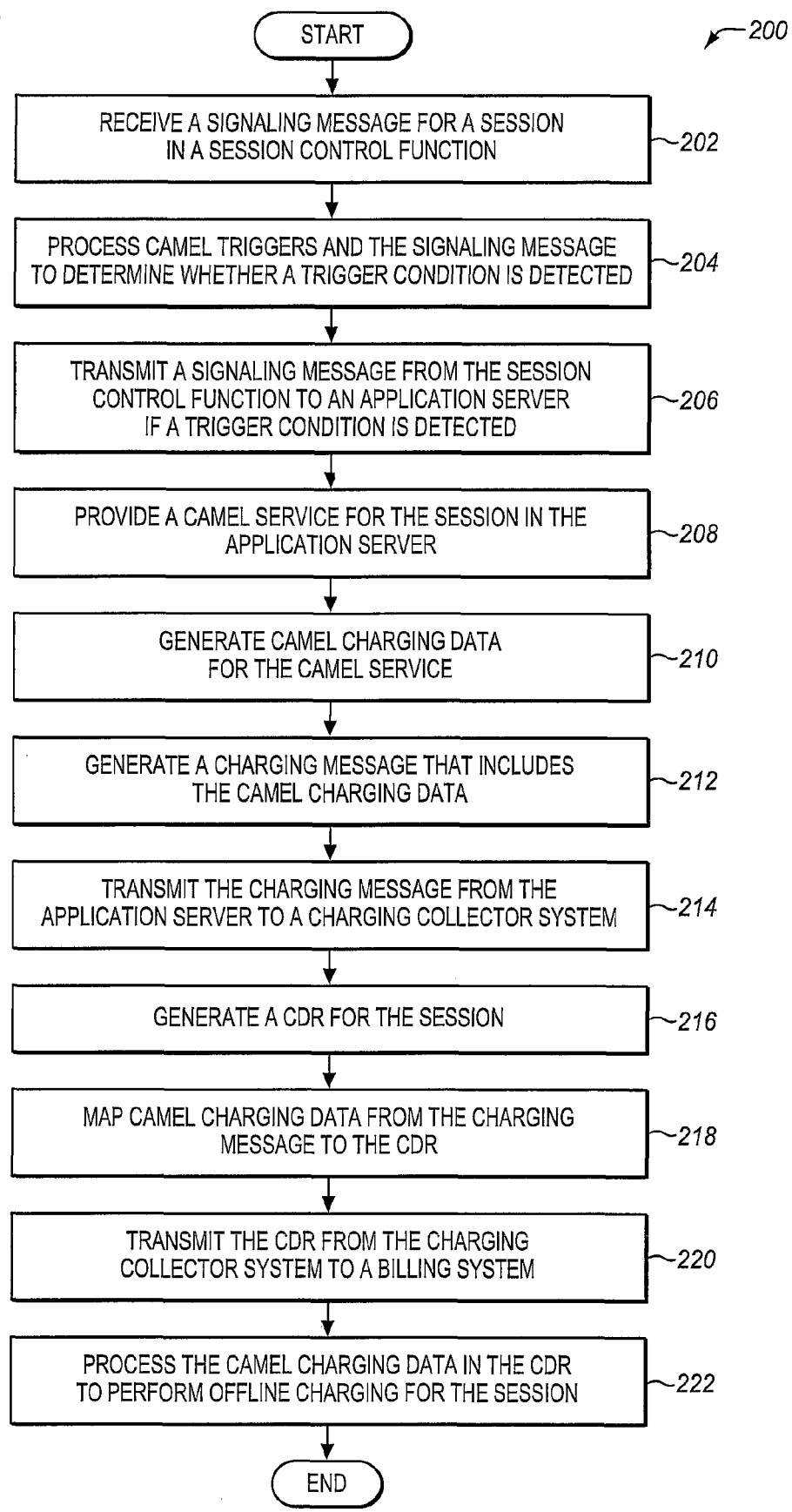
FIG. 2 is a flow chart illustrating a method of operating an IMS network to provide charging for CAMEL services in an exemplary embodiment of the invention.

FIG. 2 is a flow chart illustrating a method 200 of operating IMS network 100 to provide charging for CAMEL services in an exemplary embodiment of the invention. The steps of method 200 will be described with reference to IMS network 100 in FIG. 1. The steps of the flow chart in FIG. 2 are not all inclusive and may include other steps not shown.

In step 202 of method 200, session control function 102 receives a signaling message (e.g., a SIP INVITE message) from party 121 for the session. In step 204, session control function 102 processes CAMEL triggers and the signaling message to determine whether a trigger condition is detected. As previously stated, CAMEL triggers are defined for party 121, such as in a service profile for party 121. Session control function 102 may query a Home Subscriber Server (HSS) (not shown) to obtain the service profile for party 121, and to identify the CAMEL triggers for party 121. If a trigger condition is detected, then session control function 102 transmits a signaling message to application server 104 in step 206. The signaling message sent to application server 104 may be the same signaling message, such as a SIP INVITE message, or may be a different signaling message.

In step 208, application server 104 receives the signaling message from session control function 102, and provides a CAMEL service for the session. Responsive to providing the CAMEL service, application server 104 generates CAMEL charging data for the CAMEL service in step 210. CAMEL charging data comprises any data or information about the service provided that is used to charge for the service. In step 212, application server 104 generates a charging message for the session that includes the CAMEL charging data. The charging message may be a Diameter Rf charging message, such as a Diameter Accounting Request (ACR) message, or a charging message of another protocol. Application server 104 may include the CAMEL charging data in new attribute value pairs (AVP) of the ACR message that have been defined for the CAMEL charging data. New exemplary AVPs for an ACR message are illustrated in FIGS. 4-42. In step 214, application server 104 transmits the charging message to charging collector system 106.

Charging collector system 106 receives the charging message from application server 104. Charging collector system 106 may also receive charging messages for the session from other IMS nodes, and aggregate the charging messages. In step 216, charging collector system 106 generates or opens a charging data record (CDR) for the session. In step 218, charging collector system 106 maps CAMEL charging data from the charging message (and possibly other charging messages) to the CDR. Charging collector system 106 may include the CAMEL charging data in new fields of the CDR that have been defined for the CAMEL charging data. New exemplary fields for a CDR are described below in a later embodiment. Charging collector system 106 then transmits the CDR to billing system 108 in step 220.

In step 222, billing system 108 receives the CDR from charging collector system 106, and processes the CAMEL charging data in the CDR to perform offline charging for the CAMEL service. Billing system 108 can advantageously charge for the CAMEL service provided in the 3G IMS network 100 much like charging can be performed in 2G networks, such as a GSM network. As a result, CAMEL services may be effectively implemented in IMS network 100.

IMS networks may provide service to devices that are adapted to communicate over an IMS network and other networks, such as a 2G network (e.g., a GSM network). Devices such as this are typically referred to as dual mode devices. For example, a dual mode device may initiate a session over an IMS network when the device is in range of an access network for the IMS network, such as a WiFi network. If the dual mode device is out of range of an access network for the IMS network, then the dual mode device may initiate a call over a GSM network instead.

A dual mode device may initiate a call over a 2G network, and the 2G network may hand off the call to an IMS network, or vice-versa. In such a case, a billing system would need to correlate char data for the call from both 2G network and the IMS network. Further, if CAMEL services are provided in both networks, then the billing system would need to process CAMEL charging data for these services, and correlate the CAMEL charging data from both networks. As a result, the functionality described herein to charge for CAMEL services in an IMS network allows the billing system to handle hand offs from an IMS network to a 2G network and vice versa. Such a scenario is illustrated in FIG. 3.

Figure 3:
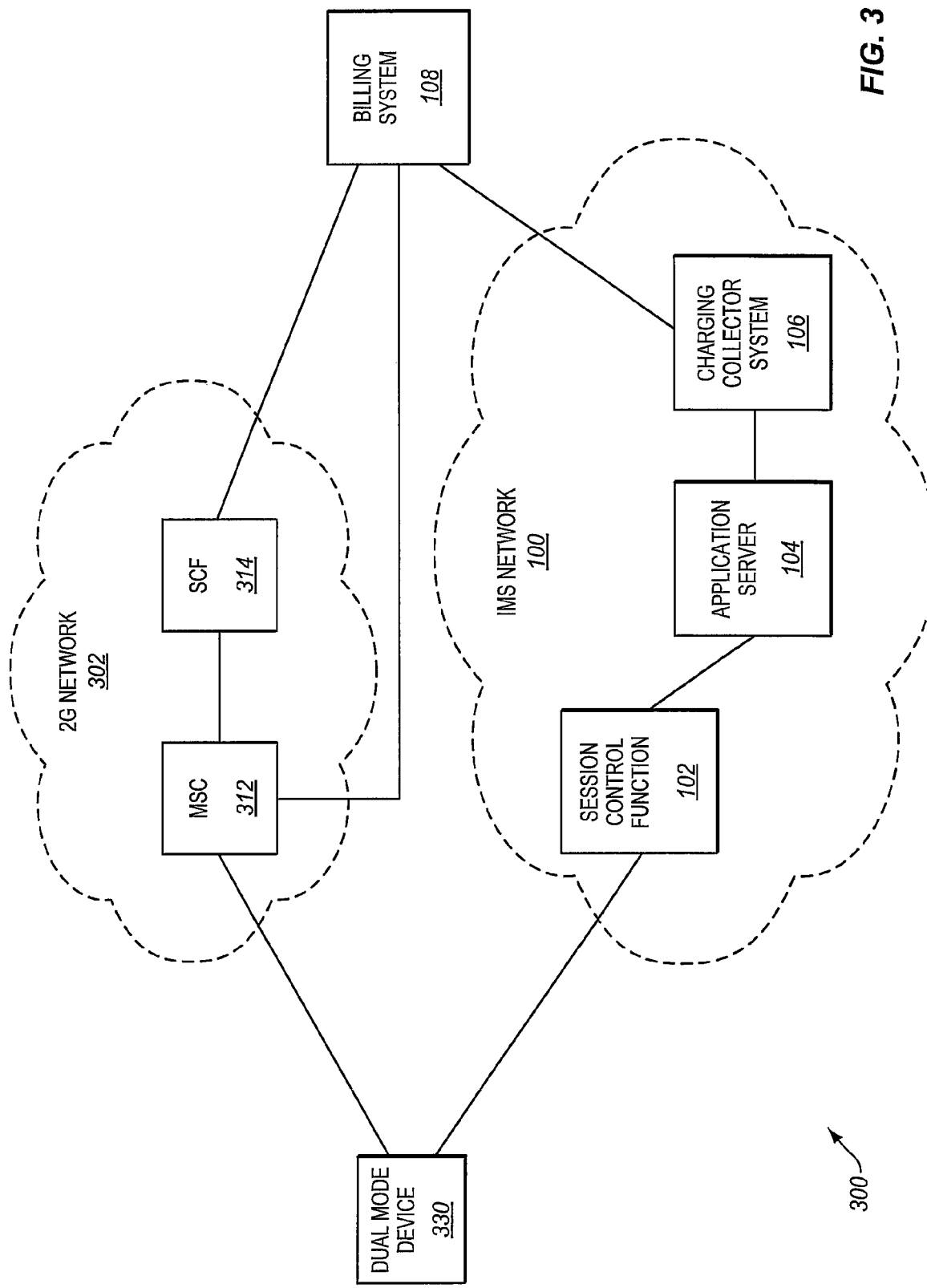
FIG. 3 illustrates a communication network in an exemplary embodiment of the invention.

FIG. 3 illustrates a communication network 300 in an exemplary embodiment of the invention. Communication network 300 includes a 2G network 302 (e.g., a GSM network), IMS network 100, and billing system 108. 2G network 302 includes a Mobile Switching Center (MSC) 312 and a CAMEL service control function (SCF) 314. As in FIG. 1, IMS network 100 includes session control function 102, application server 104, and charging collector system 106. Communication network 300 also includes dual mode device 330 adapted to communicate with both 2G network 302 and IMS network 100. Dual mode device 330 is a mobile device, but may also have wireline functionality.

Assume for this embodiment that dual mode device 330 initiates or terminates a call over 2G network 302. 2G network 302 operates as follows. MSC 312 receives signaling for the call and processes CAMEL triggers and the signaling to determine whether a CAMEL service should be invoked. If a CAMEL trigger is detected, then MSC 312 interrupts call processing and transmits a CAMEL application protocol (CAP) message to SCF 314. Responsive to the CAP message, SCF 314 provides the appropriate CAMEL service for the call. SCF 314 generates CAMEL charging data for the CAMEL service, and transmits a CAP response to MSC 312 that includes the charging data. MSC 312 will provide the CAMEL charging data to billing system 108 in a Call Detail Record (CDR) after the call ends in 2G network 302. For the duration of the call in 2G network 302, MSC 312 continues to monitor the CAMEL triggers and invoke the CAMEL services as necessary.

Assume further for this example that 2G network 302 hands the call over to IMS network 100. A hand off may occur for various reasons. For instance, when the call was initiated, dual mode device 330 may be in range of 2G network 302 but not in range of a wireless access network for IMS network 100. During the call, dual mode device 330 may move into range of a wireless access network for IMS network 100, and may request that the call be handed off to IMS network 100.

Responsive to the call being handed off, MSC 312 identifies the CAMEL charging data and other charging data for the call over 2G network 302. MSC 312 then generates a CDR and populates fields of the CDR with charging data for the call. The 2G standards for the CDR define fields for the CAMEL charging data along with fields for other charging data for the call. With the CDR fields populated properly, MSC 312 transmits the CDR to billing system 108.

In further response to the call being handed off, IMS network 100 operates as described in FIG. 2 to handle the call. Session control function 102 receives a signaling message (e.g., a SIP INVITE message) from dual mode device 330 for the call. Session control function 102 processes CAMEL triggers and the signaling message to determine whether a trigger condition is detected. If a trigger condition is detected, then session control function 102 transmits a signaling message to application server 104.

Responsive to receiving the signaling message, application server 104 provides a CAMEL service for the call. Responsive to providing the CAMEL service, application server 104 generates CAMEL charging data for the CAMEL service, and generates a charging message for the call that includes the CAMEL charging data. Again, the charging message may be a Diameter Rf charging message, such as a Diameter Accounting Request (ACR) message, or a charging message of another protocol. Application server 104 then transmits the charging message to charging collector system 106.

Charging collector system 106 receives the charging message from application server 104. Charging collector system 106 may also receive charging messages for the call from other IMS nodes. When the call ends in IMS network 100, charging collector system 106 aggregates the charging messages, and generates a CDR for the call. Charging collector system 106 maps CAMEL charging data from the charging message (and possibly other charging messages) to the CDR. Charging collector system 106 then transmits the CDR to billing system 108.

Billing system 108 receives the CDR from charging collector system 106, and also receives one or more CDRs from MSC 312. Billing system 108 processes the CAMEL charging data in the CDR from charging collector system 106 and processes the CAMEL charging data in the CDR(s) from MSC 312 to correlate the CAMEL charging data from both networks. Billing system 108 then performs offline charging for the CAMEL services based on the correlated CAMEL charging data. Because billing system 108 has CAMEL charging data from both networks, billing system 108 can advantageously charge for the CAMEL services provided even though the call was handed off from 2G network 302 to IMS network 100.

A similar process occurs when a call is handed off from IMS network 100 to 2G network 302. IMS network 100 generates CAMEL charging data for CAMEL services provided during the call, and 2G network 302 generates CAMEL charging data for CAMEL services provided during the call. Each network provides the CAMEL charging data to billing system 108 as described above so that billing system 108 can charge for the CAMEL services.

As described in the above embodiments, when application server 104 provides a CAMEL service in IMS network 100, application server 104 generates CAMEL charging data for the CAMEL service. In order to provide the CAMEL charging data to charging collector system 106, application server 104 generates a charging message that includes the CAMEL charging data. The charging message may be a Diameter Rf charging message, such as a Diameter ACR message, where application server 104 includes the CAMEL charging data in new AVPs of the ACR message. FIGS. 4-42 illustrate exemplary AVPs defined for the CAMEL charging data in exemplary embodiments of the invention. There may be variations to these AVPs, as this is just one example.

In order to provide the CAMEL charging data to billing system 108, charging collector system 106 generates a CDR that includes the CAMEL charging data. The following illustrates an exemplary CDR that includes new fields as defined for the CAMEL charging data in an exemplary embodiment of the invention. The new fields for the CAMEL-related data are indicated in bold italics below. There may be variations to these CDR fields, as these are just one example.

```
IMSRecord ::= SET
{
    recordType                      [0] CallEventRecordType,
    retransmission                  [1] NULL OPTIONAL,
    sIP-Method                      [2] SIP-Method OPTIONAL,
    role-of-Node                    [3] Role-of-Node OPTIONAL,
    nodeAddress                     [4] NodeAddress OPTIONAL,
    session-Id                      [5] Session-Id OPTIONAL,
    calling-Party-Address           [6] InvolvedParty OPTIONAL,
    called-Party-Address            [7] InvolvedParty OPTIONAL,
    privateUserID                   [8] GraphicString OPTIONAL,
    serviceRequestTimeStamp         [9] TimeStamp OPTIONAL,
    serviceDeliveryStartTimeStamp   [10] TimeStamp OPTIONAL,
    serviceDeliveryEndTimeStamp     [11] TimeStamp OPTIONAL,
    recordOpeningTime               [12] TimeStamp OPTIONAL,
    recordClosureTime               [13] TimeStamp OPTIONAL,
    interOperatorIdentifiers        [14] InterOperatorIdentifiers OPTIONAL,
    localRecordSequenceNumber       [15] LocalRecordSequenceNumber OPTIONAL,
    recordSequenceNumber            [16] INTEGER OPTIONAL,
    causeForRecordClosing           [17] CauseForRecordClosing OPTIONAL,
    incomplete-CDR-Indication       [18] Incomplete-CDR-Indication OPTIONAL,
    iMS-Charging-Identifier         [19] IMS-Charging-Identifier OPTIONAL,
    sDP-Session-Description         [20] SEQUENCE OF GraphicString OPTIONAL,
    list-Of-SDP-Media-Components    [21] SEQUENCE OF Media-Components-List
OPTIONAL,
    gGSNaddress                     [22] NodeAddress OPTIONAL,
    serviceDeliveryFailureReason    [23] ServiceDeliveryFailureReason OPTIONAL,
    list-Of-Message-Bodies          [24] SEQUENCE OF MessageBody OPTIONAL,
    cAMELrecordExtensions           [25] RecordExtensions OPTIONAL,
    applicationServersInformation   [40] SEQUENCE OF ApplicationServersInformation
OPTIONAL,
    servedPartyIPAress              [50] ServedPartyIPAddress OPTIONAL,
    transactionTimestamp            [60] TimeStamp OPTIONAL,
    s-CSCF-Information              [61] S-CSCF-Information OPTIONAL,
    service-Id                      [70] Service-Id OPTIONAL,
    trunkGroupID                    [80] TrunkGroupID OPTIONAL,
    bearerService                   [81] TransmissionMedium OPTIONAL,
    serviceSpecificData             [100] OCTET STRING OPTIONAL
}
CAMELRecordExtensions ::= SEQUENCE {
    cAMELRecord         [0] cAMELRecord OPTIONAL,
}
CAMELRecord::= SET {
    generalCAMELData    [0] GeneralCamelData OPTIONAL,
    perServiceCAMELData [1] Sequence of PerServiceCAMELData OPTIONAL
}
GeneralCAMELData ::= SET {
    severdIMSI              [0] IMSI OPTIONAL,
    servedMSISDN            [1] MSISDN OPTIONAL,
    recordingEntity         [2] RecordingEntity OPTIONAL,
    interrogationTimestamp  [3] Timestamp OPTIONAL,
    calledAddress           [4] CalledNumber OPTIONAL,
    callingAddress          [5] CallingNumber OPTIONAL,
    callReference           [6] CallReference OPTIONAL,
    mSCServerIndication     [7] mSCServerIndication OPTIONAL,
    networkCallReference    [8] NetworkCallReference OPTIONAL,
    mSCAddress              [9] MSCAddress OPTIONAL
    cAMELInitCFIndicator    [10] CAMELInitCFIndicator OPTIONAL,
    numberOfDPEncountered   [11] INTEGER OPTIONAL,
    levelOfCAMELService     [12] LevelOfCAMELService OPTIONAL
}
MSCServerIndication ::= ENUMERATED
{
    False       (0),
```

```
        True    (1)
}
CAMELInitCFIndicator ::= ENUMERATED
{
    noCAMELCallForwarding       (0),
    cAMELCallForwarding         (1)
}
LevelOfCAMELService ::= BIT STRING {
    basic                       [0],
    callDurationSupervision     [1],
    conlineCharging             [2]
}
PerServiceCAMELData ::= SET {
    gsm-SCFAddress              [0] Gsm-SCFAddress OPTIONAL,
    serviceKey                  [1] ServiceKey OPTIONAL,
    defaultCallHandling         [2] DefaultCallHandling OPTIONAL
    freeFormatData              [3] FreeFormatData OPTIONAL,
    mscIncomingTKGP             [4] TrunkGroupOPTIONAL,
    cAMLECallLegInformation     [5] SEQUENCE of CAMLECallLegInformation
OPTIONAL
}
DefaultCallHandling ::= ENUMERATED {
    continueCall    [0],
    releaseCall     [1]
}
CAMLECallLegInformation ::= SET {
    cAMELDestinationNumber      [1] CAMELDestinationNumber OPTIONAL,
    connectedAddress            [2] ConnectedNumber OPTIONAL,
    roamingNumber               [3] RoamingNumber OPTIONAL,
    mscOutgoingTKGP             [4] TrunkGroup OPTIONAL,
    seizureTime                 [5] TimeStamp OPTIONAL,
    answerTime                  [6] TimeStamp OPTIONAL,
    releaseTime                 [7] TimeStamp OPTIONAL,
    callDuration                [8] CallDuration OPTIONAL,
    cAMELInitCFIndicator        [10] CAMELInitCFIndicator OPTIONAL,
    causeForTerm                [11] CauseForTerm OPTIONAL,
    cAMELModification           [12] Sequence Of ChangedParameters OPTIONAL,
    freeFormatData              [13] FreeFormatData OPTIONAL,
    diagnostics                 [14] Diagnostics OPTIONAL,
}
ChangedParameters           ::= SET
{
    changeFlags                 [0] ChangeFlags,
    changeList                  [1] Sequence Of CAMELModificationParameters
OPTIONAL
}
CAMELModificationParameters ::= SET {
    callingPartyNumber          [0] CallingNumber OPTIONAL,
    callingPartyCategory        [1] CallingPartyCategory OPTIONAL
    originalCalledPartyNumber   [2] OriginalCalledNumber OPTIONAL,
    genericNumbers              [3] Sequence Of GenericNumbers OPTIONAL,
    redirectingPartyNumber      [4] RedirectingNumber OPTIONAL,
    redirectionCounter          [5] NumberOfForwarding OPTIONAL
}
ChangeFlags                 ::= BIT STRING
{
    callingPartyNumberModified              (0),
    callingPartyCategoryModified            (1),
    originalCalledPartyNumberModified       (2),
    genericNumbersModified                  (3),
    redirectingPartyNumberModified          (4),
    redirectionCounterModified              (5)
}
IMSI ::= TBCD-STRING (SIZE (3..8))
MSISDN::= ISDN-AddressString
ISDN-AddressString ::= AddressString (SIZE (1..maxISDN-AddressLength))
TimeStamp::= OCTET STRING (SIZE(9))
CalledNumber::= BCDDirectoryNumber
CallingNumber::= BCDDirectoryNumber
BCDDirectoryNumber::= OCTET STRING
CallReference::= INTEGER
NetworkCallReference::= CallReferenceNumber
CallReferenceNumber ::= OCTET STRING (SIZE (1..8))
MSCAddress::= AddressString
Gsm-SCFAddress      ::= ISDN-AddressString
ServiceKey ::= INTEGER (0..2147483647)
FreeFormatData::= OCTET STRING (SIZE(1..160))
TrunkGroup::=CHOICE
{
```

-continued

```
    tkgpNumber            [0] INTEGER,
    tkgpName              [1] GraphicString
}
CAMELDestinationNumber::= DestinationRoutingAddress
DestinationRoutingAddress {PARAMETERS-BOUND : bound} ::= SEQUENCE
SIZE(1) OF CalledPartyNumber {bound}
ConnectedNumber ::= BCDDirectoryNumber
RoamingNumber::= ISDN-AddressString
CallDuration ::= INTEGER
CauseForTerm::= INTEGER
Diagnostics::= CHOICE
{
    gsm0408Cause              [0] INTEGER,
    gsm0902MapErrorValue      [1] INTEGER,
    ccittQ767Cause            [2] INTEGER,
    networkSpecificCause      [3] ManagementExtension,
    manufacturerSpecificCause [4] ManagementExtension,
    positionMethodFailureCause [5] PositionMethodFailure-Diagnostic,
    unauthorizedLCSClientCause [6] UnauthorizedLCSClient-Diagnostic
}
CallingPartyCategory::= Category
Category::= OCTET STRING (SIZE(1))
OriginalCalledNumber::= BCDDirectoryNumber
GenericNumbers::= SET OF GenericNumber
GenericNumber::= BCDDirectoryNumber
RedirectingNumber::= BCDDirectoryNumber
NumberOfForwarding ::= INTEGER (1..5)
```

Although specific embodiments were described herein, the scope of the invention is not limited to those specific embodiments. The scope of the invention is defined by the following claims and any equivalents thereof.

We claim:

1. A system comprising:
an application server in an IMS network adapted to receive a signaling message for a session in the IMS network, to provide a CAMEL service for the session in the IMS network, to generate CAMEL charging data for the CAMEL service provided for the session in the IMS network, to generate a Diameter accounting request for the session that includes the CAMEL charging data, and to transmit the Diameter accounting request to a charging collector system for offline charging in the IMS network; and
the charging collector system in the IMS network adapted to receive the Diameter accounting request from the application server, to generate a charging data record for the session, to map the CAMEL charging data from the Diameter accounting request to the charging data record to allow for charging for the CAMEL service provided in the IMS network, and to transmit the charging data record to a billing system.

2. The system of claim 1 wherein:
the session is for a dual mode device;
the signaling message is for the session being handed off from a 2G network that was serving the dual mode device; and
the billing system is adapted to receive a call detail record from the 2G network that includes CAMEL charging data for a CAMEL service provided in the 2G network to the dual mode device, to process the CAMEL charging data in the charging data record received from the charging collector system and the CAMEL charging data in the call detail record received from the 2G network to correlate the CAMEL charging data from the IMS network and the 2G network, and to perform offline charging for the CAMEL services based on the correlated CAMEL charging data.

3. The system of claim 1 wherein:
the Diameter accounting request comprises a Diameter Rf Accounting Request (ACR); and
the application server is further adapted to include the CAMEL charging data in new attribute value pairs (AVP) of the Diameter Rf ACR.

4. The system of claim 1 wherein:
the charging collector system is further adapted to map the CAMEL charging data from the Diameter accounting request to new fields in the charging data record.

5. The system of claim 1 wherein:
the charging collector system is further adapted to receive a plurality of other Diameter accounting requests for the session that include CAMEL charging data, to aggregate the CAMEL charging data for the session, to map the aggregated CAMEL charging data to the fields in the charging data record, and to transmit the charging data record to the billing system.

6. The system of claim 5 wherein:
the charging collector system comprises one of a Charging Collector Function (CCF) or a Charging Data Function and Charging Gateway Function (CDF/CGF).

7. A method of providing CAMEL charging for sessions in IMS networks, the method comprising:
receiving a signaling message into an application server of an IMS network for a session in the IMS network;
providing a CAMEL service for the session in the application server;
generating CAMEL charging data for the CAMEL service provided for the session;
generating a Diameter accounting request for the session that includes the CAMEL charging data;
transmitting the Diameter accounting request from the application server to a charging collector system in the IMS network;
receiving the Diameter accounting request in the charging collector system from the application server;
generating a charging data record for the session in the charging collector system;
mapping the CAMEL charging data from the Diameter accounting request to the charging data record to allow for charging for the CAMEL service provided in the IMS network; and transmitting the charging data record from the charging collector system to a billing system.

8. The method of claim 7 wherein the session is for a dual mode device, wherein receiving a signaling message comprises receiving the signaling message for the session being handed off from a 2G network that was serving the dual mode device, and further comprising:
receiving a call detail record in the billing system from the 2G network that includes CAMEL charging data for a CAMEL service provided in the 2G network to the dual mode device;
processing the CAMEL charging data in the charging data record received from the charging collector system and the CAMEL charging data in the call detail record received from the 2G network to correlate the CAMEL charging data from the IMS network and the 2G network; and
performing offline charging for the CAMEL services based on the correlated CAMEL charging data.

9. The method of claim 7 wherein generating a Diameter accounting request for the session that includes the CAMEL charging data comprises:
generating a Diameter Rf Accounting Request (ACR) that includes the CAMEL charging data in new attribute value pairs (AVP) of the Diameter Rf ACR.

10. The method of claim 7 wherein mapping the CAMEL charging data from the Diameter accounting request to the charging data record comprises:
mapping the CAMEL charging data from the Diameter accounting request to new fields in the charging data record.

11. The method of claim 7 further comprising:
receiving a plurality of other Diameter accounting requests for the session into the charging collector system that include CAMEL charging data;
aggregating the CAMEL charging data for the session; and
mapping the aggregated CAMEL charging data to the fields in the charging data record.

12. A method of providing CAMEL charging for sessions in an IMS network, the method comprising:
providing a CAMEL service in an application server of the IMS network for a session established over the IMS network;
generating CAMEL charging data in the application server of the IMS network for the CAMEL service provided for the session;
generating a Diameter Rf Accounting Request (ACR) in the application server of the IMS network for the session;
including the CAMEL charging data in the Diameter Rf ACR;
transmitting the Diameter Rf ACR from the application server to a charging collector system for offline charging in the IMS network;
generating a charging data record for the session in the charging collector system;
mapping the CAMEL charging data from the Diameter Rf ACR to the charging data record; and
transmitting the charging data record from the charging collector system to a billing system.

13. The method of claim 12 wherein generating a Diameter Rf ACR for the session that includes the CAMEL charging data comprises:
generating the Diameter Rf ACR; and
including the CAMEL charging data in new attribute value pairs (AVP) of the Diameter Rf ACR.

14. The method of claim 12 wherein mapping the CAMEL charging data from the Diameter Rf ACR to the charging data record comprises:
mapping the CAMEL charging data from the Diameter Rf ACR to new fields in the charging data record.

15. The method of claim 12 further comprising:
receiving the charging data record in the billing system; and
processing the CAMEL charging data in the charging data record to perform offline charging for the CAMEL service.

* * * * *